(12) United States Patent
Pedersen

(10) Patent No.: US 9,232,129 B2
(45) Date of Patent: Jan. 5, 2016

(54) METHOD AND APPARATUS FOR AUGMENTING AND CORRECTING MOBILE CAMERA OPTICS ON A MOBILE DEVICE

(71) Applicant: Nvidia Corporation, Santa Clara, CA (US)

(72) Inventor: Christen Pedersen, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 2 days.

(21) Appl. No.: 14/094,401

(22) Filed: Dec. 2, 2013

(65) Prior Publication Data

US 2015/0153544 A1    Jun. 4, 2015

(51) Int. Cl.

| | | |
|---|---|---|
| *H04N 5/232* | (2006.01) | |
| *G02B 7/16* | (2006.01) | |
| *G02B 15/06* | (2006.01) | |
| *G02B 15/10* | (2006.01) | |

(52) U.S. Cl.
CPC .............. *H04N 5/23212* (2013.01); *G02B 7/16* (2013.01); *G02B 15/06* (2013.01); *G02B 15/10* (2013.01)

(58) Field of Classification Search
CPC .................................................. G02B 13/0015
USPC .......................................................... 396/74
See application file for complete search history.

(56) References Cited

U.S. PATENT DOCUMENTS

| | | | | |
|---|---|---|---|---|
| 2005/0101348 | A1* | 5/2005 | Wang ......................... | 455/556.1 |
| 2009/0181729 | A1* | 7/2009 | Griffin et al. .............. | 455/575.1 |
| 2010/0194897 | A1* | 8/2010 | Yumiki ...................... | 348/208.4 |
| 2013/0130753 | A1* | 5/2013 | Springer .................... | 455/575.1 |
| 2013/0177304 | A1* | 7/2013 | Chapman et al. ............. | 396/533 |
| 2013/0267283 | A1* | 10/2013 | Guzman ..................... | 455/575.1 |
| 2014/0036144 | A1* | 2/2014 | Zou ................................ | 348/373 |
| 2014/0267882 | A1* | 9/2014 | O'Neill et al. ................ | 348/360 |

\* cited by examiner

*Primary Examiner* — Albert Cutler

(57) ABSTRACT

Embodiments of the present invention utilize an attachable lens board that can be secured to the back of a mobile device and placed in a position that is proximate to the built-in camera lens associated with the camera system of the mobile device. As such, the lens board can be positioned to accurately align several different auxiliary camera lenses, each installed within various camera lens receivers formed within the lens board, with the built-in camera lens for focusing and/or image capture. Additionally, embodiments of present invention can include circuitry within the lens board that can be used to identify the types of lenses currently installed within each camera lens receiver. In this manner, embodiments of the present invention can correct possible optical imperfections of resultant images produced by the combination of the built-in camera lens and auxiliary lens selected for focusing and/or image capture by the user.

20 Claims, 7 Drawing Sheets

Exemplary Registration of an Installed Camera Lens

Exemplary Process of Registering Installed Camera Lenses

METHOD AND APPARATUS FOR AUGMENTING AND CORRECTING MOBILE CAMERA OPTICS ON A MOBILE DEVICE

FIELD OF THE INVENTION

Embodiments of the present invention are generally related to the field of devices capable of image capture (e.g., digital cameras, etc).

BACKGROUND OF THE INVENTION

Conventional mobile devices, such as smartphones and tablets, include technology to perform a number of different functions. For example, a popular function available on most conventional mobile devices is the ability to take photographs a digital camera system. Many sophisticated camera systems included with conventional mobile devices possess automatic focusing features that enable them to capture high quality images of subjects that are of interest to the user.

However, when engaging these focusing features, many of these camera systems offer very little flexibility in terms of providing users with a wide range of lens choices other than the standard built-in camera system fixed lens. Conventional solutions, to provide lens flexibility, generally require gluing metal rings to the mobile device or adding large cases over the mobile device in order to perform auxiliary focusing functions using auxiliary lenses. As such, these solutions often only provide one or two lens choices for the user to use when capturing an image with the camera system. Furthermore, these conventional solutions are often mechanically cumbersome for the user to utilize.

SUMMARY OF THE INVENTION

Accordingly, a need exists for a solution that enables users to readily select from a wider range of auxiliary camera lenses, in addition to the standard built-in camera lens of the mobile device, when capturing an image. Embodiments of the present invention utilize an attachable lens board that can be secured to the back of a mobile device and placed in a position that is proximate to the built-in camera lens associated with the camera system of the mobile device. As such, the lens board or "wheel" can be positioned to accurately align several different auxiliary camera lenses, each installed within various camera lens receivers formed within the lens board, with the built-in camera lens for focusing and/or image capture. Additionally, embodiments of present invention can include circuitry within the lens board that can be used to identify the types of lenses currently installed within each camera lens receiver. In this manner, embodiments of the present invention can correct possible optical imperfections of resultant images produced by the combination of the built-in camera lens and auxiliary lens selected for focusing and/or image capture by the user.

More specifically, in one embodiment, the present invention is implemented as a lens apparatus assembly for a mobile device. The apparatus includes a generally flat member that includes a plurality of camera lens receivers, in which a first camera lens receiver of the plurality of camera lens receivers comprises a plurality of flexible members adapted to secure the first camera lens installed within the first camera lens receiver. In one embodiment, the member further includes a second camera lens receiver adapted to install a second camera lens within the second camera lens receiver to produce a second focus position, in which the first camera lens and the second camera lens are of different types. In one embodiment, the first camera lens and the second camera lens are telephoto lenses.

In one embodiment, the first camera lens receiver includes circuitry to communicate signals that identify the first camera lens to the mobile device. In one embodiment, the mobile device adjusts a resultant image produced by a combination of the first camera lens and the built-in camera system lens based on the signals received by the first camera lens receiver.

The member also includes a first coupling element adapted to couple the member to the mobile device along an exterior surface of the mobile device, in which the first coupling element is operable to couple with a first coupling element of the mobile device to rotatably align the first camera lens with a built-in camera system lens of the mobile device to produce a first focus position. In one embodiment, the member includes a second coupling element adapted to couple to a second coupling element of the mobile device for securing alignment of the first focus position, the second coupling element disposed along an outer periphery of the member relative to the first coupling element. In one embodiment, the first coupling element and the second coupling element of the member and the mobile device are magnets.

In one embodiment, the present invention is implemented as a method of focusing a camera system of a mobile device. The method includes coupling an attachable, generally flat member to the mobile device along an exterior surface of the mobile device, where the member includes a plurality of camera lens receivers, in which a first camera lens receiver of the plurality of camera lens receivers includes a plurality of flexible members adapted to secure the first camera lens within the first camera lens receiver. The member also includes a coupling elements adapted to couple the member to the mobile device along the exterior surface, in which the coupling elements are adapted to align the first camera lens receiver with a built-in camera system lens associated with the camera system.

The method also includes inserting the first camera lens within the first camera lens receiver and aligning the first camera lens with the built-in camera system lens to set a first focus position for focusing the camera system. In one embodiment, the exterior surface includes coupling elements for coupling with the coupling elements of the member. In one embodiment, the coupling elements of the member and of the mobile device are magnets.

In one embodiment, the method includes installing a second camera lens within a second camera lens receiver of the plurality of camera lens receivers and aligning the second camera lens with the built-in camera system lens to produce a second focus position, in which the first camera lens and the second camera lens are of different magnification types. In one embodiment, the first camera lens and the second camera lens are telephoto lenses.

In one embodiment, the method includes using the first camera lens receiver to communicate signals that identify the first camera lens to the mobile device. In one embodiment, the method includes adjusting a resultant image produced by a combination of the first camera lens and the built-in camera system lens based on the signals received by the first camera lens receiver.

In one embodiment, the present invention is implemented as an attachable lens assembly apparatus for a mobile device. The apparatus includes a generally circular flat member that includes a plurality of camera lens receivers each for securing a respective lens for installation therein, in which a first camera lens receiver of the plurality of camera lens receivers includes a plurality of physical members adapted to install the first camera lens within the first camera lens receiver.

In one embodiment, the first camera lens is integrated with the first camera lens receiver during manufacture of said member. In one embodiment, the first camera lens is an interchangeable camera lens removeably installed within the first camera lens receiver after manufacture of the member. In one embodiment, the first camera lens receiver includes a means for receiving signals from the mobile device and responsive thereto for performing zooming operations with the first camera lens. In one embodiment, the first camera lens receiver includes a means for communicating signals that identify the first camera lens to the mobile device.

The member also includes a first magnetic element adapted to couple the member to the mobile device along a magnetized exterior surface of the mobile device, in which the first magnetic element is adapted to couple with the magnetized exterior surface to rotatably align the first camera lens with a built-in camera system lens of the mobile device to produce a first focus position. In one embodiment, the member further includes a second magnetic element adapted for securing the first focus position, in which the second magnetic element is located along an outer periphery of the member relative to the first magnetic element.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follow are presented and discussed in terms of a process. Although operations and sequencing thereof are disclosed in a figure herein (e.g., FIG. 3) describing the operations of this process, such operations and sequencing are exemplary. Embodiments are well suited to performing various other operations or variations of the operations recited in the flowchart of the figure herein, and in a sequence other than that depicted and described herein.

As used in this application the terms controller, module, system, and the like are intended to refer to a computer-related entity, specifically, either hardware, firmware, a combination of hardware and software, software, or software in execution. For example, a module can be, but is not limited to being, a process running on a processor, an integrated circuit, a subject, an executable, a thread of execution, a program, and or a computer. By way of illustration, both an application running on a computing device and the computing device can be a module. One or more modules can reside within a process and/or thread of execution, and a component can be localized on one computer and/or distributed between two or more computers. In addition, these modules can be executed from various computer readable media having various data structures stored thereon.

Exemplary Apparatus for Performing Auxiliary Focusing Procedures

Figure 1A:
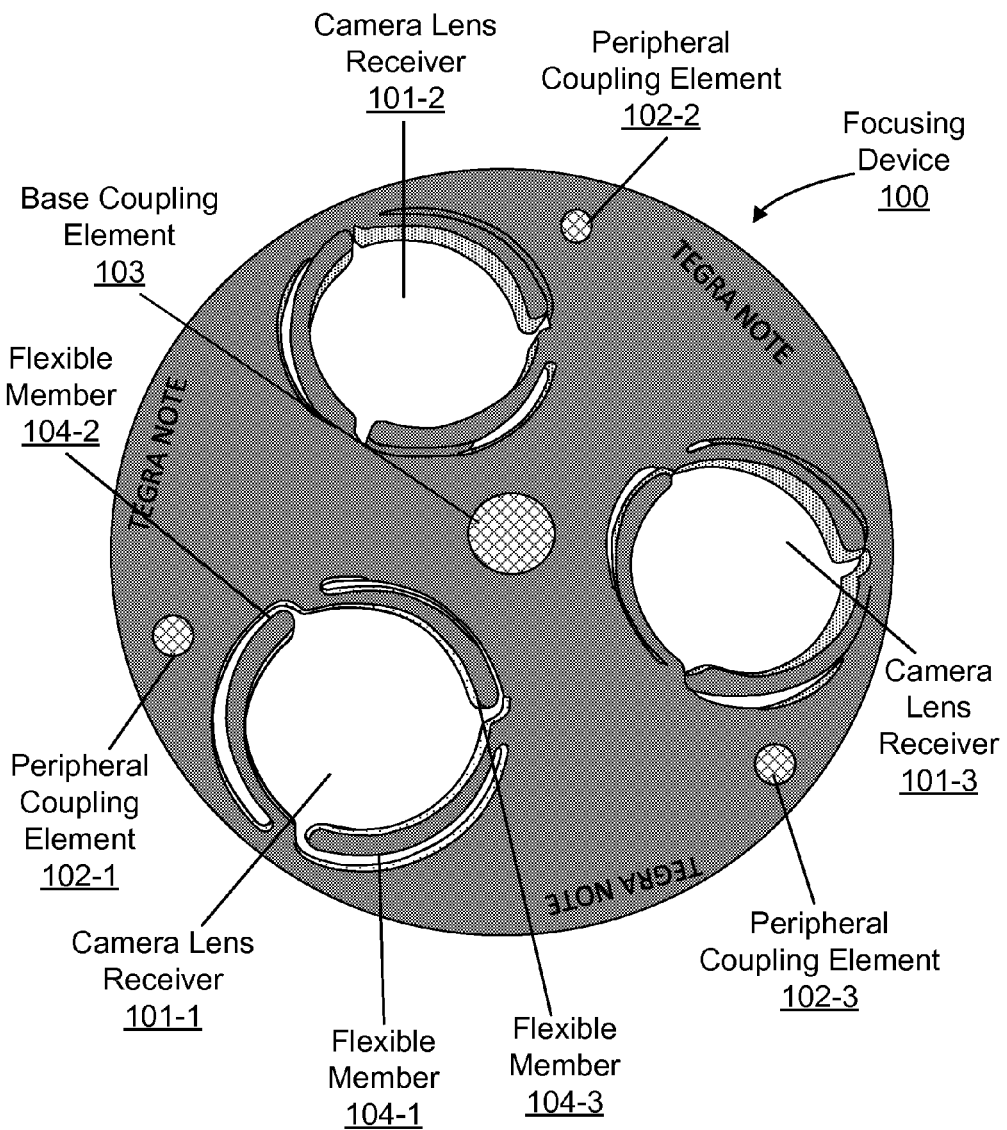
FIG. 1A depicts an exemplary focusing apparatus used for performing auxiliary focusing procedures with the camera system of a mobile device in accordance with embodiments of the present invention.

FIG. 1A depicts an exemplary attachable focusing apparatus capable of performing auxiliary focusing procedures in tandem with the camera system of a mobile device in accordance with embodiments of the present invention. Focusing device 100 may be of such resilient composition and dimensions that it may be capable of securing a plurality of different installed camera lenses that can be used for capturing images at different magnification levels. In one embodiment, materials used to produce focusing device 100 may include, but are not limited to, plastic or polymer material, metal or alloy material, acrylic, delrin, wood, composite material, foam, rubber, fabric, fiberglass, carbon fiber or any other material capable of providing low friction when placed against the exterior surface of a mobile device and excellent dimensional stability, as well as any combination thereof.

Focusing device 100 can be a generally flat and/or circular structure that includes a plurality of receivers in which each receiver is adapted to secure an installed camera lens capable of performing auxiliary focusing procedures in tandem with the camera system of a mobile device. Mobile devices may include, for example, a digital camera, cell phone camera, portable electronic device (e.g., entertainment device, handheld device), webcam, video device (e.g., camcorder) and the like. The body of focusing device 100 may be of such dimensions (e.g., thickness, depth, etc.) so as to sufficiently secure and/or stabilize a camera lens within a given camera lens receiver. For instance, as illustrated by the embodiment depicted in FIG. 1A, focusing device 100 may include three camera lens receivers (e.g., camera lens receivers 101-1, 101-2, 101-3) adapted to secure three different camera lenses (e.g., telephoto lenses, polarizing filter lenses, macro lenses, wide-angle, fish eye lenses, etc.).

In this manner, camera lens receivers 101-1, 101-2, and/or 101-3 may each be of uniform dimensions for installing camera lenses of a similar type (e.g., camera lenses of a similar magnification type and/or level, etc.). In one embodiment, camera lens receivers 101-1, 101-2, and/or 101-3 can be of different dimensions such that each receiver is adapted for installing a different type of camera lens. For instance, camera lens receivers 101-1, 101-2 and/or 101-3 can be separately adapted for installing camera lenses of different magnification types and/or levels. Furthermore, the distance between camera lens receivers 101-1, 101-2, and/or 101-3 may be equal or of varying lengths.

According to one embodiment, camera lenses may be installed within a respective camera lens receiver by the user or during manufacture of focusing device 100. For example, camera lenses may be adapted to fit within the general dimensions of camera lens receivers 101-1, 101-2, and/or 101-3 and/or focusing device 100 (e.g., depth, width, etc. of focusing device 100). Also, in one embodiment, the body of focusing device 100 may be adapted for inserting/removing a camera lens designed for such installation/removal procedures post-manufacture (herein referred to as "interchangeable camera lenses"). In this manner, focusing device 100 can be configured to include a plurality of flexible members adapted to secure an interchangeable camera lens of various different thread sizes within a camera lens receiver.

For example, as illustrated by the embodiment depicted in FIG. 1A, camera lens receivers 101-1, 101-2 and 101-3 can each include a set of flexible members (e.g., flexible members 104-1, 104-2, 104-3) that are each adapted to install and/or remove an interchangeable camera lens within their respective receivers. For purposes of maintaining the simplicity of FIG. 1A, only the flexible members of camera lens receiver 101-1 are labeled, despite camera lens receivers 101-2 and 101-3 each including their own respective set of flexible members.

Flexible members may be a generally circular or coil-like structure configured to be placed between an interchangeable camera lens and the walls of a camera lens receiver within the body of focusing device 100. In this manner, an interchangeable camera lens may be installed and/or secured through placement within and against a flexible member or a set of flexible members (e.g., threaded lenses inserted within camera lens receiver, screwed-in to camera lens receiver, etc.). Furthermore, as illustrated in FIG. 1A, camera lens receivers 101-1, 101-2 and 101-3 may be adapted to include gaps between a flexible member and a sidewall of a camera lens receiver in order to facilitate the easy installment and/or removal of a wider selection of interchangeable camera lenses.

Figure 1B:
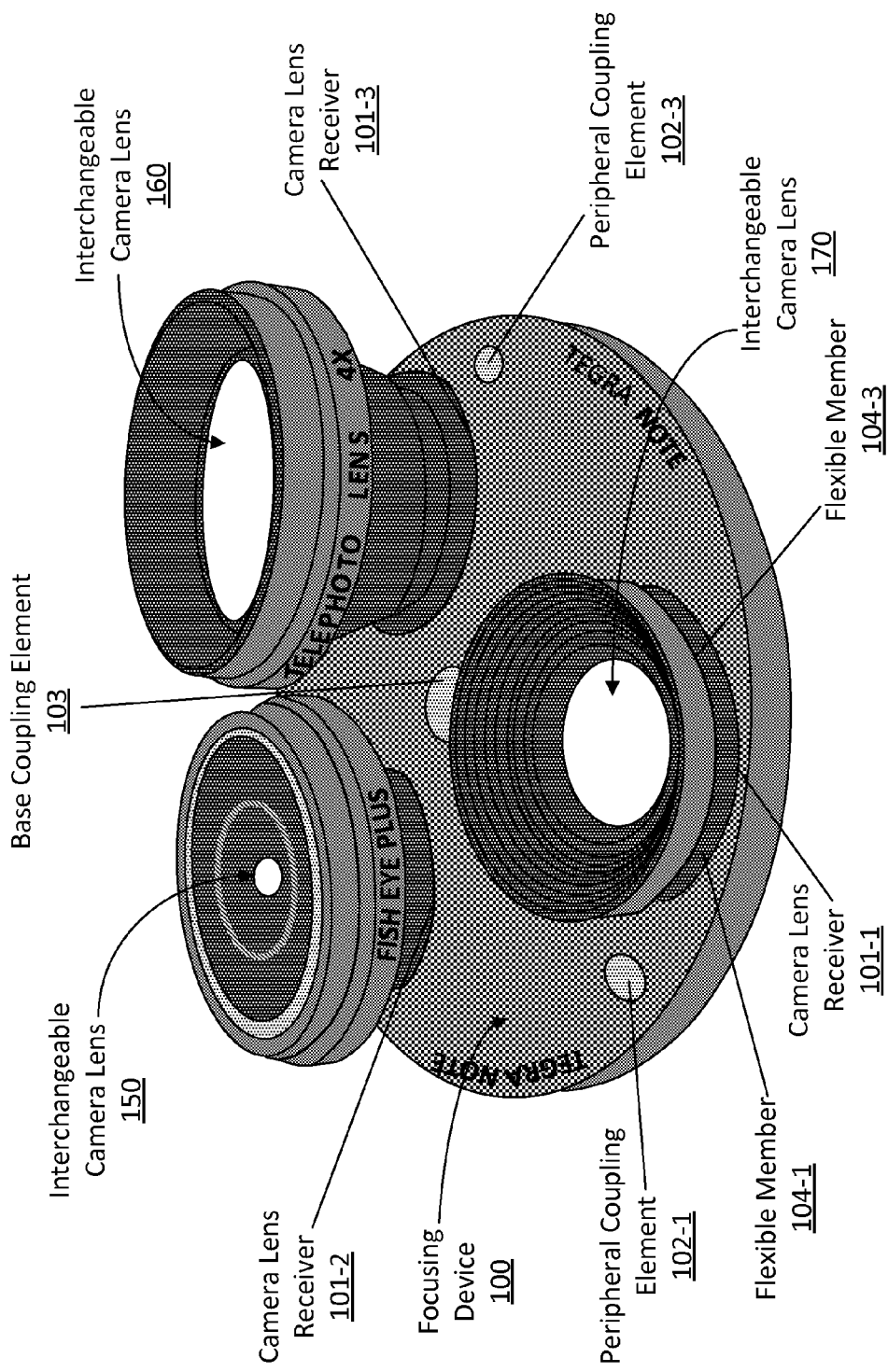
FIG. 1B depicts an exemplary configuration of installed camera lenses within an exemplary focusing apparatus used for performing auxiliary focusing procedures with the camera system of a mobile device in accordance with embodiments of the present invention.

FIG. 1B depicts an exemplary configuration in which a plurality of interchangeable lenses are installed and secured within a set of flexible members in accordance with embodiments of the present invention. As illustrated in FIG. 1B, interchangeable lens 170 may be installed and/or secured through placement within camera lens receiver 101-1 and against flexible members 104-1, 104-2 (hidden from view behind interchangeable lens 170) and 104-3. In a similar manner, interchangeable lenses 150 and 160 may also be installed and/or secured through placement within and against flexible members of camera lens receivers 101-2 and camera lens receiver 101-3, respectively.

Additionally, as illustrated by the embodiments depicted in FIGS. 1A and 1B, focusing device 100 can include a number of coupling elements adapted to couple focusing device 100 to a mobile device and position it with respect to the camera system of the mobile device. In this manner, focusing device 100 can use base coupling element 103 and/or peripheral coupling elements 102-1, 102-2, and 102-3 to align a camera lens installed within focusing device 100 with the built-in camera lens of the mobile device (process often referred to as "registration" of a camera lens). For instance, in one embodiment, base coupling element 103 and/or peripheral coupling elements 102-1, 102-2, and 102-3 can be magnets that couple focusing device 100 to magnetic portions of the mobile device. By using magnetized coupling elements in this manner, embodiments of the present invention can facilitate easier coupling and/or de-coupling of focusing device 100 to/from a mobile device and/or perform registration of an auxiliary camera lens.

Figure 1C:
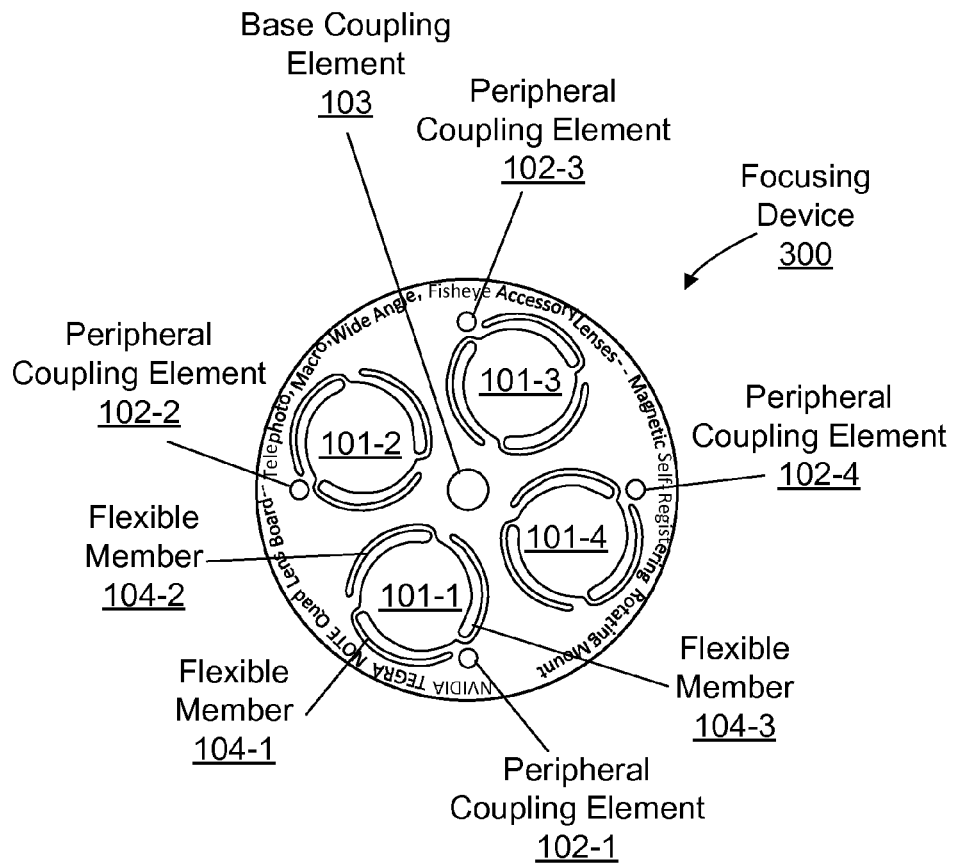
FIG. 1C depicts another exemplary focusing apparatus used for performing auxiliary focusing procedures with the camera system of a mobile device in accordance with embodiments of the present invention.
Figure 1D:
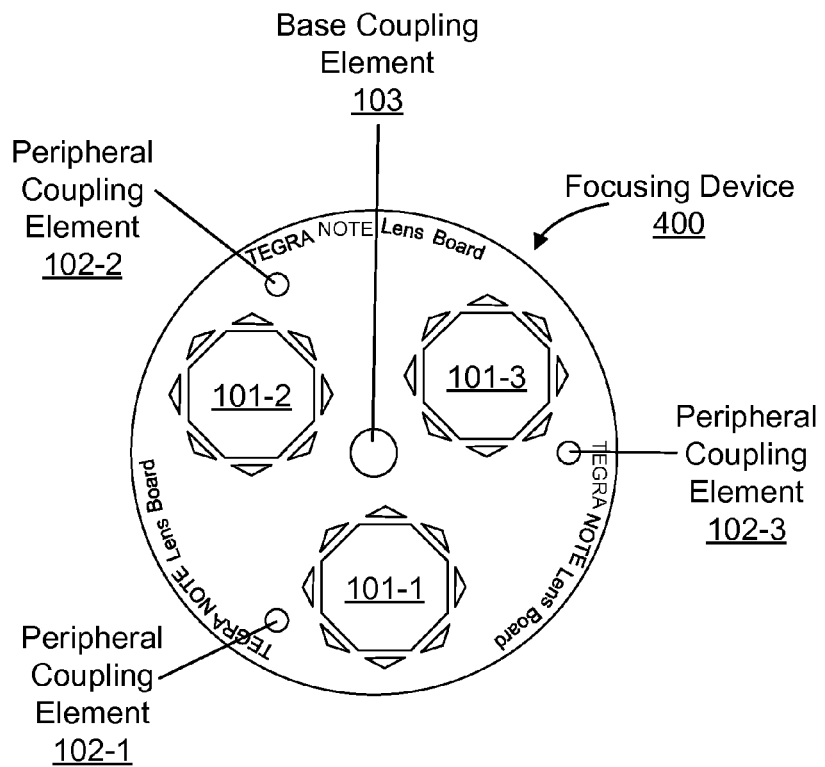
FIG. 1D depicts yet another exemplary focusing apparatus used for performing auxiliary focusing procedures with the camera system of a mobile device in accordance with embodiments of the present invention.

FIGS. 1C and 1D depict additional exemplary embodiments of a focusing device in accordance with embodiments of the present invention. For example, with reference to the embodiment depicted in FIG. 1C, focusing device 300 is similar in terms of functionality to embodiments described herein (e.g., focusing device 100). As illustrated in FIG. 1C, focusing device 300 can include additional camera lens receivers (e.g., camera lens receivers 101-4) along with corresponding flexible members. Additionally, focusing device 300 can include additional peripheral coupling elements (e.g., peripheral coupling element 102-4) which can be used to further couple focusing device 300 to a mobile device and/or perform registration procedures with a camera system associated with the mobile device.

As such, the distance between camera lens receivers 101-1, 101-2, 101-3 and/or 101-4 may be equal or of varying lengths and may be arranged in a manner that least likely negates the intended functionality of base coupling element 103 and/or peripheral coupling elements 102-1, 102-2, 102-3, and 102-4 in accordance with embodiments of the present invention. Furthermore, base coupling element 103 and/or peripheral coupling elements 102-1, 102-2, 102-3, and 102-4 may be of varying sizes relative to each other. For instance, as illustrated by the embodiment depicted in FIG. 1C, base coupling element 103 may be larger than peripheral coupling elements 102-1, 102-2, 102-3 and/or 102-4. In one embodiment, peripheral coupling elements 102-1, 102-2, 102-3 and/or 102-4 may be larger than base coupling element 103 or equivalent in size.

With reference to the embodiment depicted in FIG. 1D, focusing device 400 is similar in terms of functionality to embodiments described herein (e.g., focusing device 100, focusing device 300). However, as illustrated in FIG. 1D, focusing device 400 can include camera lens receivers that are adapted for inserting/removing interchangeable camera lenses without flexible members. As such, camera lens receivers 101-1, 101-2 and/or 101-3 of focusing device 400 can each include grooves within their respective receivers that are adapted for installing/removing threaded interchangeable camera lens.

In this manner, each camera lens receivers can support the installation and/or removal of various interchangeable camera lens types (e.g., telephoto lenses, polarizing filer lenses, macro lenses, wide-angle, fish eye, etc.) based on a groove pattern associated with a particular interchangeable camera lens. For example, in one embodiment, camera lens receivers 101-1, 101-2, and/or 101-3 may each be manufactured with uniform groove patterns for installing/removing camera lenses of a similar type (e.g., camera lenses of a similar magnification type and/or level, etc.). In one embodiment, camera lens receivers 101-1, 101-2, and/or 101-3 may each be manufactured with different groove patterns such that each receiver is adapted for installing/removing an interchangeable camera lens that is different from another receiver.

Exemplary Method for Performing Auxiliary Focusing Procedures

Figure 2A:
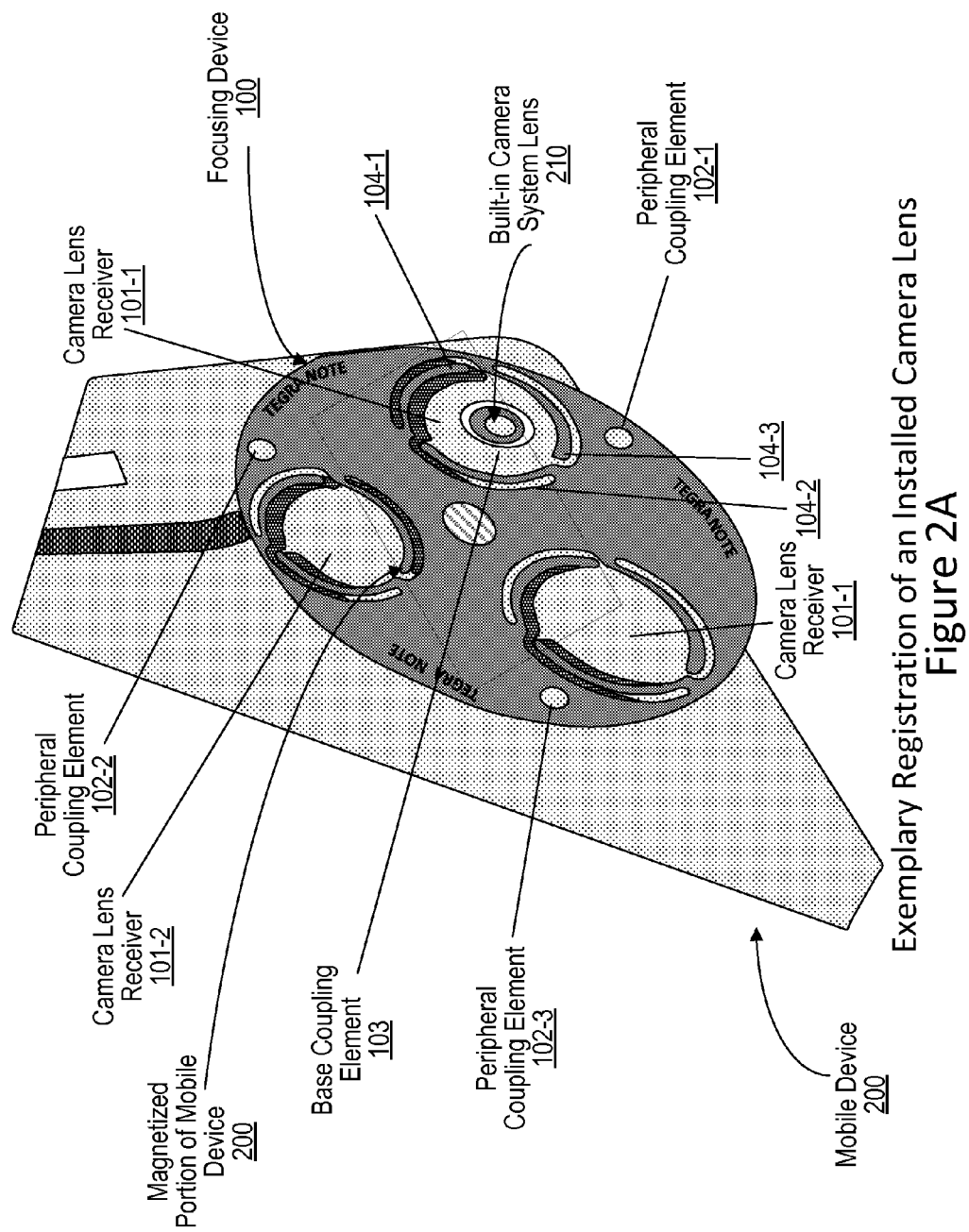
FIG. 2A depicts an exemplary camera lens registration process of an auxiliary camera lens using an exemplary focusing apparatus in accordance with embodiments of the present invention.

FIG. 2A depicts an exemplary camera lens registration process performed using a focusing apparatus (e.g., focusing apparatus 100) in accordance with embodiments of the present invention. Mobile device 200 includes magnetic components that are positioned within its casing and proximate to the position of a built-in camera system lens (e.g., built-in camera system lens 210) associated with the camera system of mobile device 200. In this manner, the casing of mobile device 200 may be of such material and thickness so as to allow base coupling element 103 and/or peripheral coupling elements 102-1, 102-2, and 102-3 to be magnetically coupled to mobile device 200 along its exterior surface.

Furthermore, the magnetic components within mobile device 200 can allow a level of friction between focusing device 100 and the exterior surface of mobile device 200 that enables base coupling element 103 and/or peripheral coupling elements 102-1, 102-2, and 102-3 to maintain continuous contact with mobile device 200 when placed in various positions along its exterior surface. For example, magnetic components within mobile device 200 can allow a level of friction that enables focusing device 100 to glide along the exterior surface of mobile device 200. In this manner, base coupling element 103 as well as peripheral coupling elements 102-1, 102-2, and/or 102-3 can be positioned in a manner that enables focusing device 100 to perform camera lens registration procedures with built-in camera system lens 210 with general ease.

Figure 2B:
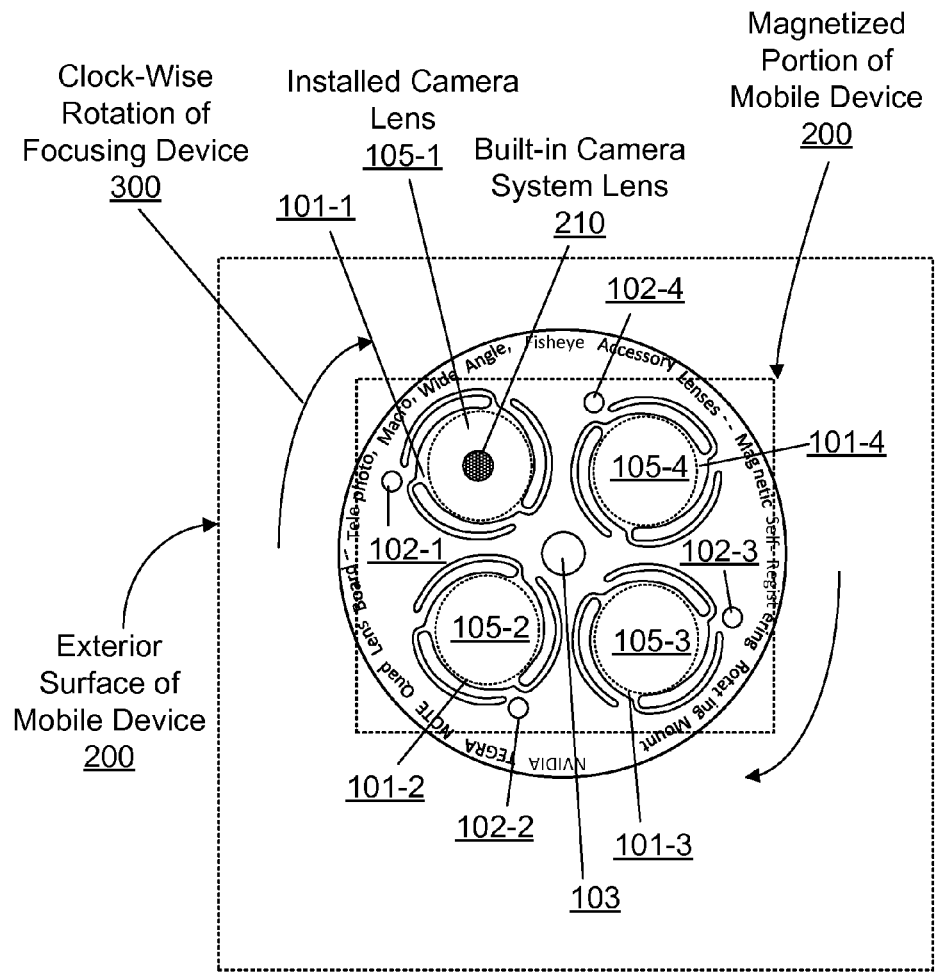
FIG. 2B depicts another exemplary camera lens registration process of an auxiliary camera lens using an exemplary focusing apparatus in accordance with embodiments of the present invention.

FIG. 2B depicts another exemplary camera lens registration process performed using a focusing apparatus (e.g., focusing apparatus 300) in accordance with embodiments of the present invention. Camera lenses installed within camera lens receivers 101-1, 101-2, 101-3 and/or 101-4 (e.g., installed camera lens 105-1, installed camera lens 105-2, installed camera lens 105-3, installed camera lens 105-4, respectively), may be lenses installed during manufacture of focusing device 300 or interchangeable lenses installed post-manufacture. As illustrated by the embodiment depicted in FIG. 2B, base coupling element 103 can be magnetically coupled to a position along mobile device 200's exterior surface that is also proximate to built-in camera system lens 210. As such, base coupling element 103 may act as a pivot point which enables focusing device 100 to rotate installed camera lens 105-1, installed camera lens 105-2, installed camera lens 105-3, and installed camera lens 105-4 in a clockwise motion along an axis and parallel to the exterior surface of mobile device 200 and/or built-in camera system lens 210.

Peripheral coupling elements 102-1, 102-2, 102-3 and/or 102-4 can similarly rotate around base coupling element 103 to secure a desirable alignment between an installed camera lens and built-in camera system lens 210. Upon determination of a desirable alignment between an installed camera lens and built-in camera system lens 210, peripheral coupling elements 102-1, 102-2, 102-3 and/or 102-4 can be magnetically coupled to magnetic portions of mobile device 100's exterior surface in a manner that allows a user to secure the desirable alignment and capture a desirable image with the camera system of mobile device 200.

For example, as illustrated by the embodiment depicted in FIG. 2B, a user may wish to align a camera lens installed within camera lens receiver 101-1 (e.g., installed camera lens 105-1) with built-in camera system lens 210 to focus and/or capture a desirable image. As such, peripheral coupling elements 102-1, 102-2, 102-3 and/or 102-4 can be magnetically coupled to magnetic portions of mobile device 100's exterior surface to secure this desired alignment.

However, a user may desire a second focus position installed camera lens 105-2. As such, the user may rotate camera lens receiver 101-2 circumferentially around base coupling element 103 in a clock-wise manner until installed camera lens 105-2 is sufficiently aligned with built-in camera system lens 210. Accordingly, peripheral coupling elements 102-1, 102-2, 102-3 and/or 102-4 can be magnetically coupled to magnetic portions of mobile device 200's exterior surface to secure this second alignment for focusing and/or capturing an image using this second focus position.

In a similar manner, a user may desire a third focus position using installed camera lens 105-3. As such, the user may rotate camera lens receiver 101-3 circumferentially around base coupling element 103 in a clock-wise manner until installed camera lens 105-3 is sufficiently aligned with built-in camera system lens 210. Accordingly, peripheral coupling elements 102-1, 102-2, 102-3 and/or 102-4 can be magnetically coupled to magnetic portions of mobile device 200's exterior surface to secure this third alignment for focusing and/or capturing an image using this third focus position.

Furthermore, a user may desire a fourth focus position using installed camera lens 105-4. As such, the user may rotate camera lens receiver 101-4 circumferentially around base coupling element 103 until installed camera lens 105-4 is sufficiently aligned with built-in camera system lens 210. Accordingly, peripheral coupling elements 102-1, 102-2, 102-3 and/or 102-4 can be magnetically coupled to magnetic portions of mobile device 200's exterior surface to secure this fourth alignment for focusing and/or capturing an image using this fourth focus position.

According to one embodiment, mobile device 200 may include magnetic components that are positioned along its exterior surface and proximate to the position of built-in camera system lens 210. In this manner, mobile device 200 may include exterior magnets (e.g., magnetic substrates) that allow base coupling element 103 and/or peripheral coupling elements 102-1, 102-2, 102-3 and/or 102-4 to be magnetically coupled to mobile device 200 along its exterior surface and perform their respective functions in accordance with embodiments of the present invention. As such, these exterior magnets may be strategically positioned in a manner that facilitates the efficient performance of registration procedures in accordance with embodiments of the present invention.

Furthermore, embodiments of the present invention may include circuitry that enables focusing devices (e.g., focusing device 100, focusing device 300, focusing device 400, etc.) to electronically perform various focusing procedures in combination with mobile devices. As such, registration procedures can be performed through an automated process using motorized components or circuits built into a focusing device. In one embodiment, focusing devices can include switches or buttons that are configured for controlling the registration process. In one embodiment, focusing devices may be capable of converting signals received from a mobile device into a digital signal using known digital signal conversion processing techniques. Furthermore, signals may be transmitted through wired network connections as well as wireless network connections, including, but not limited to, infrared technology, Bluetooth technology, Wi-Fi networks, the Internet, etc.

According to one embodiment, focusing devices can include circuitry within each camera lens receiver that can communicate signals to and receive signals and/or power from mobile devices. For example, with further reference to FIG. 2B, camera lens receivers 101-1, 101-2, 101-3 and/or 101-4 can each be configured to recognize different types of camera lenses installed within their respective receivers and correspondingly communicate signals that identify these lenses to modules within mobile device 200. As such, mobile device 200 can adjust the optics of its camera system based on installed camera lenses identified by focusing device 300.

In one embodiment, based on the camera lenses identified by camera lens receivers 101-1, 101-2, 101-3 and/or 101-4, a module executed by mobile device 200 can correct distorted resultant images produced by the combination of an identified camera lens and the built-in camera lens 210. In one embodiment, mobile device 200 can use focus metrics for automatically detecting which auxiliary lens is positioned over built-in camera lens 210. For example, mobile device 200 can detect a degree of focus using focal points within the field of view of mobile device 200's camera system. As such, a plurality of focus points can be collected and organized in a manner (e.g., using a 64×64 grid of focus points) that enables embodiments of the present invention to detect which lens is in-place over built-in camera lens 210.

Accordingly, with the assistance of focusing devices in this manner, the camera systems of mobile devices can produce a final adjusted image that may be desirable to the user.

In one embodiment, focusing devices can receive signals from mobile devices to perform optical functions with a camera lens installed within a camera lens receiver. For instance, with reference to FIG. 2B, focusing device 300 can receive signals from mobile device 200 to adjust the zoom levels of installed camera lens 105-1, installed camera lens 105-2, installed camera lens 105-3, and/or installed camera lens 105-4.

Furthermore, in one embodiment, focusing devices can receive signals from mobile devices indicating the user's preference for a particular camera lens installed. For example, in response to signals received from mobile device 200 indicating the user's preference for a camera lens installed within focusing device 300 (e.g., installed camera lens 105-1, installed camera lens 105-2, installed camera lens 105-3, installed camera lens 105-4, etc.), focusing device 300 can correspondingly perform automated registration procedures with the camera lens selected by the user and built-in camera lens 210 in a manner that allows the user to capture a desirable image with the camera system of mobile device 200.

Figure 3:
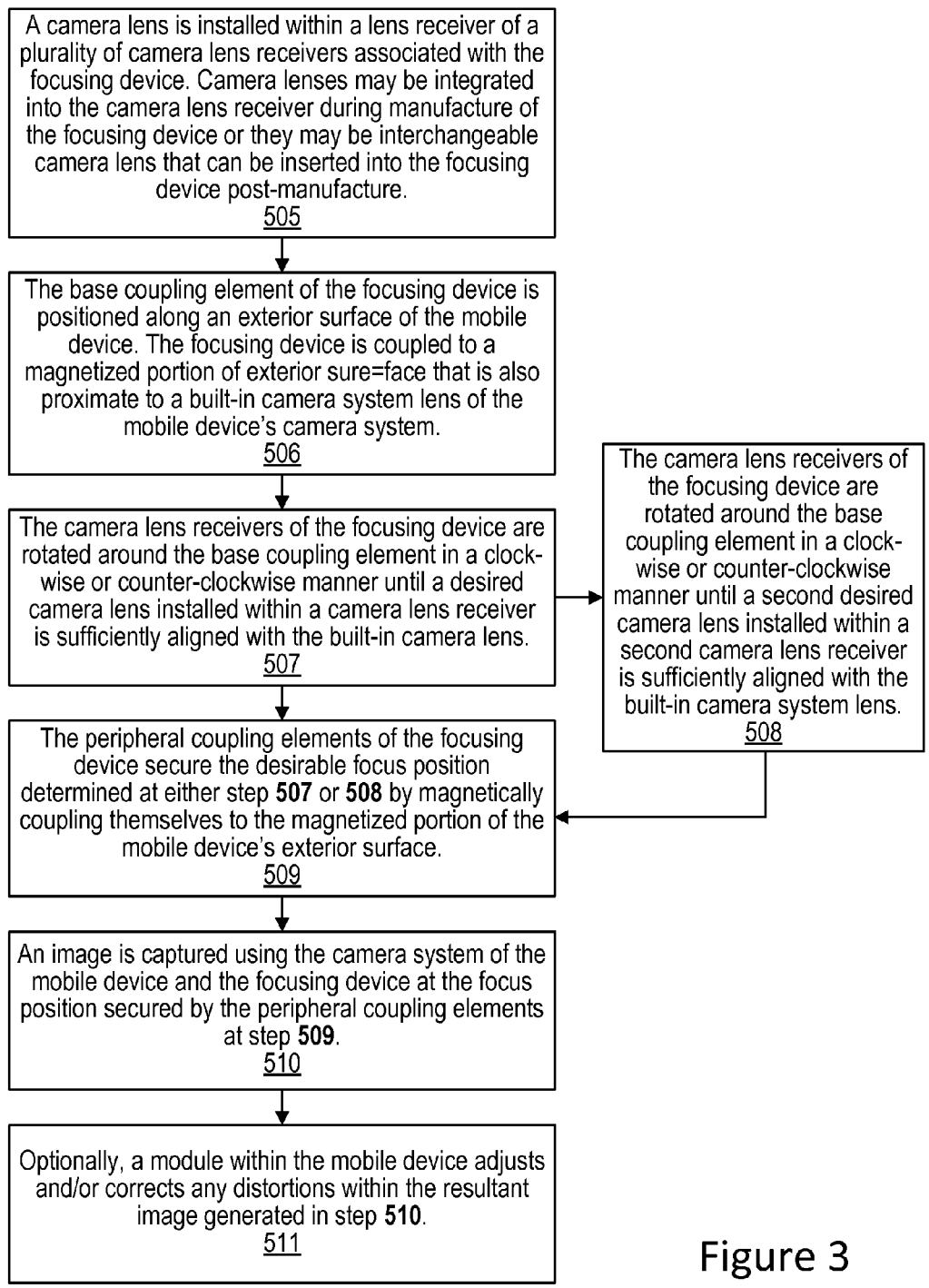
FIG. 3 is a flow chart of an exemplary camera lens registration process of an auxiliary camera lens using an exemplary focusing apparatus in accordance with embodiments of the present invention.

FIG. 3 is a flow chart of an exemplary camera lens registration process of an auxiliary camera lens using an exemplary focusing apparatus in accordance with embodiments of the present invention.

At step 505, a camera lens is installed within a lens receiver of a plurality of camera lens receivers associated with the focusing device. Camera lenses may be integrated into the camera lens receiver during manufacture of the focusing device or they may be interchangeable camera lens that can be inserted into the focusing device post-manufacture.

At step 506, the base coupling element of the focusing device is positioned along an exterior surface of the mobile device. The focusing device is coupled to a magnetized portion of exterior surface that is also proximate to a built-in camera system lens of the mobile device's camera system.

At step 507, the camera lens receivers of the focusing device are rotated around the base coupling element in a clock-wise or counter-clockwise manner until a desired camera lens installed within a camera lens receiver is sufficiently aligned with the built-in camera system lens.

At step 508, the camera lens receivers of the focusing device are rotated around the base coupling element in a clock-wise or counter-clockwise manner until a second desired camera lens installed within a second camera lens receiver is sufficiently aligned with the built-in camera system lens.

At step 509, the peripheral coupling elements of the focusing device secure the desirable focus position determined at either step 507 or 508 by magnetically coupling themselves to the magnetized portion of mobile device's exterior surface.

At step 510, an image is captured using the camera system of the mobile device and the focusing device at the focus position secured by the peripheral coupling elements at step 509.

At step 511, optionally, a module within the mobile device adjusts and/or corrects any distortions within the resultant image generated at step 510.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Many modifications and variations of the present disclosure are possible in light of the above teachings. It is intended that the scope of the invention be defined by the Claims appended hereto and their equivalents.

What is claimed is:

1. A lens apparatus for a mobile device, said apparatus comprising:
    a generally flat member comprising:
        a plurality of camera lens receivers, wherein a first camera lens receiver of said plurality of camera lens receivers comprises a plurality of flexible members adapted to secure a first camera lens installed within said first camera lens receiver;
        a first coupling element adapted to couple said flat member to said mobile device along an exterior surface of said mobile device, wherein said first coupling element is operable to couple with a first coupling element of said mobile device to rotatably align said first camera lens with a built-in camera system lens of said mobile device to produce a first focus position; and
        a second coupling element adapted to couple to a second coupling element of said mobile device for securing alignment of said first focus position.

2. The apparatus as described in claim 1, wherein said second coupling element of said flat member is disposed along an outer periphery of said flat member relative to said first coupling element.

3. The apparatus as described in claim 2, wherein said first coupling element and said second coupling element of said flat member and said mobile device are magnets.

4. The apparatus as described in claim 1, wherein said flat member further comprises a second camera lens receiver adapted to install a second camera lens within said second camera lens receiver to produce a second focus position, wherein said first camera lens and said second camera lens are of different types.

5. The apparatus as described in claim 4, wherein said first camera lens and said second camera lens are telephoto lenses.

6. The apparatus as described in claim 1, wherein said first camera lens receiver includes circuitry to communicate signals that identify said first camera lens to said mobile device.

7. The apparatus as described in claim 6, wherein said mobile device adjusts a resultant image produced by a combination of said first camera lens and said built-in camera system lens based on said signals received by said first camera lens receiver.

8. A method of focusing a camera system of a mobile device, said method comprising:
  coupling an attachable, generally flat member to said mobile device along an exterior surface of said mobile device, wherein said member comprises:
    a plurality of camera lens receivers, wherein a first camera lens receiver of said plurality of camera lens receivers comprises a plurality of flexible members adapted to secure a first camera lens within said first camera lens receiver; and
    a plurality of coupling elements adapted to couple said flat member to said mobile device along said exterior surface, wherein said coupling elements are adapted to align said first camera lens receiver with a built-in camera system lens associated with said camera system;
  inserting said first camera lens within said first camera lens receiver; and
  aligning said first camera lens with said built-in camera system lens to set a first focus position for focusing said camera system.

9. The method as described in claim 8, wherein said exterior surface comprises coupling elements for coupling with said coupling elements of said flat member.

10. The method as described in claim 9, wherein said coupling elements of said flat member and of said mobile device are magnets.

11. The method as described in claim 9, further comprising installing a second camera lens within a second camera lens receiver of said plurality of camera lens receivers and aligning said second camera lens with said built-in camera system lens to produce a second focus position, wherein said first camera lens and said second camera lens are of different magnification types.

12. The method as described in claim 11, wherein said first camera lens and said second camera lens are telephoto lenses.

13. The method as described in claim 8, further comprising using said first camera lens receiver to communicate signals that identify said first camera lens to said mobile device.

14. The method as described in claim 13, further comprising adjusting a resultant image produced by a combination of said first camera lens and said built-in camera system lens based on said signals received by said first camera lens receiver.

15. An attachable lens assembly apparatus for a mobile device, said apparatus comprising:
  a generally circular flat member comprising:
    a plurality of camera lens receivers each for securing a respective lens for installation therein, wherein a first camera lens receiver of said plurality of camera lens receivers comprises a plurality of physical members adapted to install a first camera lens within said first camera lens receiver;
    a first magnetic element adapted to couple said flat member to said mobile device along a magnetized exterior surface of said mobile device, wherein said first magnetic element is adapted to couple with said magnetized exterior surface to rotatably align said first camera lens with a built-in camera system lens of said mobile device to produce a first focus position; and
    a second magnetic element adapted for securing said first focus position to a second coupling element of said mobile device.

16. The apparatus as described in claim 15, wherein said second magnetic element is located along an outer periphery of said flat member relative to said first magnetic element.

17. The apparatus as described in claim 15, wherein said first camera lens is integrated with said first camera lens receiver during manufacture of said flat member.

18. The apparatus as described in claim 15, wherein said first camera lens is an interchangeable camera lens removeably installed within said first camera lens receiver after manufacture of said flat member.

19. The apparatus as described in claim 15, wherein said first camera lens receiver includes a means for receiving signals from said mobile device and responsive thereto for performing said zooming operations with said first camera lens.

20. The apparatus as described in claim 15, wherein said first camera lens receiver includes a means for communicating signals that identify said first camera lens to said mobile device.

* * * * *